United States Patent
Sato et al.

(10) Patent No.: US 9,803,539 B2
(45) Date of Patent: Oct. 31, 2017

(54) INTERNAL-COMBUSTION ENGINE

(71) Applicant: HONDA MOTOR CO., LTD., Tokyo (JP)

(72) Inventors: Hiroaki Sato, Wako (JP); Yasuhiro Motohashi, Wako (JP); Haruya Kitano, Wako (JP); Masayoshi Takahashi, Wako (JP); Hiromitsu Hirano, Wako (JP); Shun Tanaka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 486 days.

(21) Appl. No.: 13/681,422

(22) Filed: Nov. 20, 2012

(65) Prior Publication Data

US 2013/0133615 A1 May 30, 2013

(30) Foreign Application Priority Data

Nov. 25, 2011 (JP) ................... 2011-257256

(51) Int. Cl.
*F02B 23/06* (2006.01)
*F02M 61/14* (2006.01)
(Continued)

(52) U.S. Cl.
CPC ........ *F02B 23/0651* (2013.01); *F02B 23/104* (2013.01); *F02M 61/14* (2013.01);
(Continued)

(58) Field of Classification Search
CPC ........ F02M 61/1806–61/1846; F02B 23/0627; F02B 23/063; F02B 23/0636;
(Continued)

(56) References Cited

U.S. PATENT DOCUMENTS 1,498,273 A * 6/1924 Hesselman ............. F02B 23/00
123/276
3,244,159 A * 4/1966 Meurer ............... F02B 23/0657
123/255

(Continued)

FOREIGN PATENT DOCUMENTS

JP 04-6535 U 1/1992
JP 04-370319 12/1992
(Continued)

OTHER PUBLICATIONS

Japanese Office Action for corresponding JP Application No. 2011-257256, dated Oct. 1, 2013.

*Primary Examiner* — Sizo Vilakazi
*Assistant Examiner* — Brian Kirby
(74) *Attorney, Agent, or Firm* — Mori & Ward, LLP

(57) ABSTRACT

An internal-combustion engine includes a cylinder, a piston, a spark plug, and a fuel injection valve. The piston includes a top surface and a cavity provided in the top surface. The cavity includes a bottom surface, a vertical wall, a first sidewall, and a second sidewall. The fuel injection valve includes a plurality of injection ports from which a plurality of fuel mists are to be obliquely injected toward the top surface of the piston in respectively different directions at a predetermined crank angle in a compression stroke. The cavity extends from a position close to a center of the piston toward the fuel injection valve when viewed from above the top surface of the piston. The first and second sidewalls extend toward the fuel injection valve when viewed from above the top surface of the piston.

24 Claims, 11 Drawing Sheets

(51) Int. Cl.
*F02B 23/10* (2006.01)
*F02M 61/18* (2006.01)
*F02M 39/00* (2006.01)

(52) U.S. Cl.
CPC ... *F02M 61/1813* (2013.01); *F02B 2023/103* (2013.01); *F02M 39/00* (2013.01); *Y02T 10/125* (2013.01)

(58) Field of Classification Search
CPC .............. F02B 23/0642; F02B 23/0645; F02B 23/0651; F02B 23/0669; F02B 23/0678; F02B 23/0687; F02B 23/10; F02B 23/101; F02B 23/104; F02B 2023/103
USPC ............................ 123/299, 276, 74, 308–309
See application file for complete search history.

(56) References Cited

U.S. PATENT DOCUMENTS

| | | | | |
|---|---|---|---|---|
| 4,771,948 A * | 9/1988 | Furukawa | ......... | F02M 51/0675 239/533.12 |
| 4,838,222 A * | 6/1989 | Yanagisawa | ........ | F02B 23/0651 123/263 |
| 4,877,004 A * | 10/1989 | Nishizawa | ........... | F02M 69/044 123/188.14 |
| 4,958,604 A * | 9/1990 | Hashimoto | ........... | F02B 23/104 123/260 |
| 5,115,789 A * | 5/1992 | Aoyama | ............. | F02B 23/0669 123/299 |
| 5,259,348 A * | 11/1993 | Kobayashi | ............ | F02B 23/104 123/260 |
| 5,720,253 A * | 2/1998 | Matoba | ................. | F02B 23/104 123/298 |
| 6,035,822 A * | 3/2000 | Suzuki | ................... | F02B 23/104 123/276 |
| 6,223,715 B1 * | 5/2001 | Suzuki | ................... | F02B 23/104 123/276 |
| 6,612,282 B2 * | 9/2003 | Yu | ........................ | F02B 23/104 123/262 |
| 6,983,733 B2 * | 1/2006 | Yamashita | ............ | F02B 17/005 123/295 |
| 7,021,274 B2 * | 4/2006 | Nakayama | ............ | F02B 17/005 123/294 |
| 7,165,526 B2 * | 1/2007 | Nakayama | ............ | F02B 23/104 123/298 |
| 7,216,624 B2 * | 5/2007 | Mizobuchi | ............ | F02B 23/104 123/305 |
| 7,334,563 B2 * | 2/2008 | Mifuji | .................. | F02M 61/162 123/299 |
| 7,770,556 B2 * | 8/2010 | Kihara | .................. | F02B 23/104 123/299 |
| 8,056,531 B2 * | 11/2011 | Xu | ........................ | F02B 23/104 123/280 |
| 8,151,762 B2 * | 4/2012 | Nishimoto | ............ | F02B 23/104 123/298 |
| 2002/0029758 A1 * | 3/2002 | Baika | .................... | F02B 23/104 123/298 |
| 2006/0102141 A1 * | 5/2006 | Nakayama | ............ | F02B 23/104 123/298 |
| 2007/0079797 A1 * | 4/2007 | Kihara | .................. | F02B 23/104 123/298 |
| 2008/0196691 A1 * | 8/2008 | Kihara | .................. | F02B 23/104 123/299 |
| 2009/0025680 A1 * | 1/2009 | Kihara | .................. | F02B 23/104 123/299 |
| 2009/0235897 A1 * | 9/2009 | Fujikawa | .............. | F02B 23/104 123/305 |
| 2010/0175660 A1 * | 7/2010 | Nishimoto | ............ | F02B 23/104 123/305 |
| 2010/0186709 A1 * | 7/2010 | Ikeya | .................. | F02B 23/0651 123/307 |
| 2011/0162621 A1 * | 7/2011 | Xu | ........................ | F02B 23/104 123/305 |

FOREIGN PATENT DOCUMENTS

| | | | | |
|---|---|---|---|---|
| JP | 2004-019456 | 1/2004 | | |
| JP | 2006-291839 | 10/2006 | | |
| JP | 2010196615 A | * | 9/2010 | .......... Y02T 10/125 |
| JP | 2010196615 A | * | 9/2010 | .......... Y02T 10/125 |

* cited by examiner

INTERNAL-COMBUSTION ENGINE

CROSS-REFERENCE TO RELATED APPLICATIONS

The present application claims priority under 35 U.S.C. §119 to Japanese Patent Application No. 2011-257256, filed Nov. 25, 2011, entitled "Internal-Combustion Engine." The contents of this application are incorporated herein by reference in their entirety.

BACKGROUND OF THE INVENTION

Field of the Invention

The present application relates to an internal-combustion engine.

Discussion of the Background

An in-cylinder direct-injection internal-combustion engine as an exemplary related art is disclosed by Japanese Patent No. 4054223. This internal-combustion engine includes a piston that reciprocates in a cylinder, and a spark plug and a fuel injection valve that face a combustion chamber provided in the cylinder. The piston has a cavity eccentrically provided in the top surface thereof and extending from a position near the center of the piston to a position near an injection port of the fuel injection valve. The cavity has first and second guiding walls provided near the injection port and near the center of the piston, respectively. The first guiding wall forms a sloping surface extending obliquely and linearly upward from the bottom surface of the cavity in a direction toward the fuel injection valve. The second guiding wall forms another sloping surface extending obliquely and linearly upward from the bottom surface of the cavity in a direction away from the fuel injection valve.

The fuel injection valve is configured to inject fuel mists from the injection port thereof. The fuel mists include a main fuel mist and a sub-fuel mist injected at respectively different predetermined angles. The fuel mists each have a flat shape in side view and a fan shape in plan view. The main fuel mist is injected at a nearly vertical angle and toward a side nearer to the fuel injection valve. The sub-fuel mist is injected at a nearly horizontal angle and toward a side farther from the fuel injection valve.

To cause stratified combustion when, for example, the internal-combustion engine is under a low load and at a low rotational speed, the fuel is injected from the fuel injection valve in the latter stage of the compression stroke. Most of the main fuel mist thus injected is guided along the first guiding wall, whereby a rich air-fuel mixture is produced in the combustion chamber near the injection port of the fuel injection valve. Meanwhile, most of the sub-fuel mist collides with and is guided upward along the second guiding wall, whereby a rich air-fuel mixture is produced in the combustion chamber near the spark plug. The rest of the main fuel mist and the rest of the sub-fuel mist overlap each other and stay in the cavity. Thus, the air-fuel mixture is distributed at a desired concentration in the combustion chamber and, in this state, ignition with a spark plug is initiated, whereby stable combustion is made to occur by flame propagation.

SUMMARY OF THE INVENTION

According to one aspect of the present invention, an internal-combustion engine includes a cylinder, a piston, a spark plug, and a fuel injection valve. The cylinder includes a combustion chamber. The piston is provided in the cylinder to reciprocate in the cylinder and includes a top surface and a cavity provided in the top surface. The cavity includes a bottom surface, a vertical wall, a first sidewall, and a second sidewall. The vertical wall is provided near a center of the top surface and stands substantially perpendicularly from the bottom surface. The first sidewall is connected to a first end of the vertical wall. The second sidewall is connected to a second end of the vertical wall. The second end is opposite to the first end in the vertical wall. The spark plug is provided above the combustion chamber to generate a spark that ignites a mixture of fuel and air in the cylinder and to face toward a position close to a center of the combustion chamber. The fuel injection valve faces the combustion chamber and includes a plurality of injection ports from which a plurality of fuel mists are to be obliquely injected toward the top surface of the piston in respectively different directions at a predetermined crank angle in a compression stroke. The cavity extends from a position close to a center of the piston toward the fuel injection valve when viewed from above the top surface of the piston. The first and second sidewalls extend toward the fuel injection valve when viewed from above the top surface of the piston. The plurality of injection ports includes a first injection port, second injection ports, and a third injection port. A first fuel mist is to be injected at the predetermined crank angle from the first injection port toward the vertical wall and an adjoining portion adjoining the vertical wall. The adjoining portion is provided in the top surface of the piston. A pair of second fuel mists is to be injected at the predetermined crank angle from the second injection ports to respectively collide with the first and second sidewalls. The first and second sidewalls are provided to guide the second fuel mists to flow along the first and second sidewalls toward the vertical wall. A third fuel mist is to be injected from the third injection port to collide with the bottom surface of the cavity. The bottom surface is provided to lift the first fuel mist and the second fuel mists to flow toward the spark plug.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
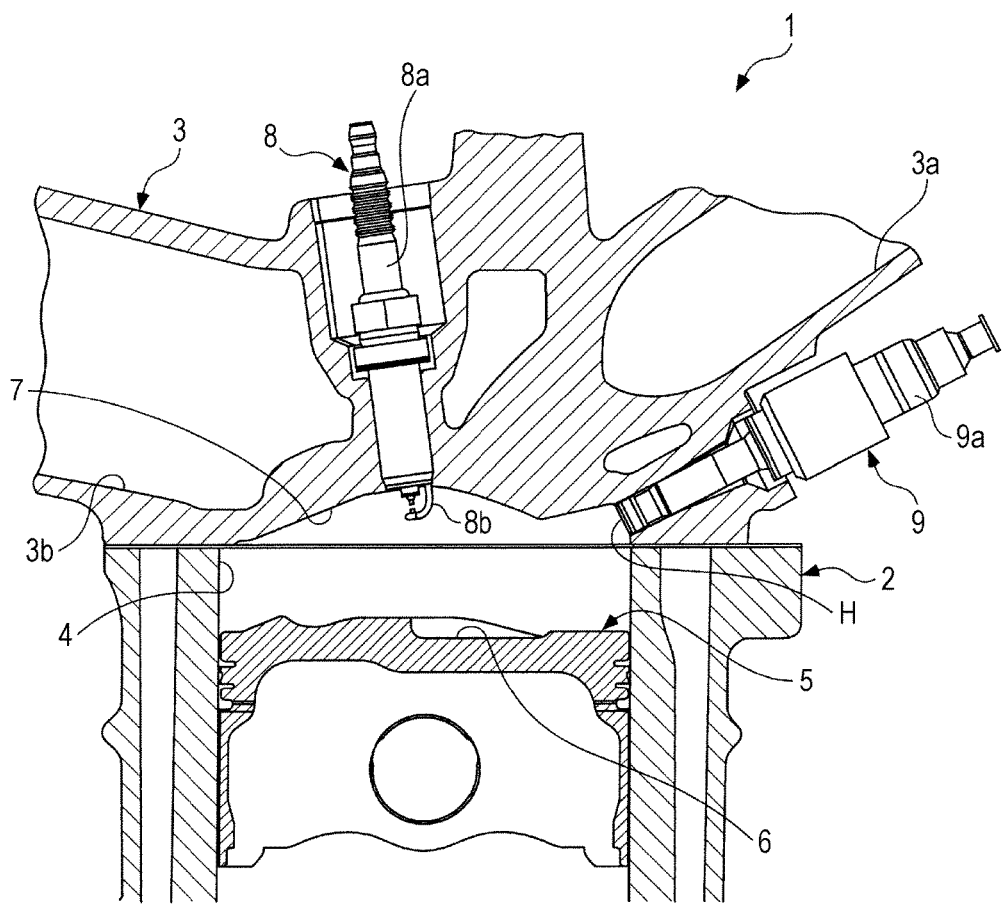
FIG. 1 is a sectional view illustrating part of an internal-combustion engine according to an embodiment of the present application.

The embodiments will now be described with reference to the accompanying drawings, wherein like reference numerals designate corresponding or identical elements throughout the various drawings.

FIG. 1 illustrates an internal-combustion engine (hereinafter referred to as "engine") 1 according to an embodiment of the present application. The engine 1 is, for example, an in-line four-cylinder gasoline engine and is provided in a vehicle (not illustrated). The engine 1 includes a cylinder block 2 and a cylinder head 3 provided on the cylinder block 2.

The cylinder block 2 includes four cylinders 4 each being open at the top and having a tubular shape. FIG. 1 only illustrates one of the cylinders 4, and the following description is given focusing on the one cylinder 4. The cylinder 4 is provided with a piston 5. Cooling water that cools the engine 1 flows in a water jacket (not illustrated).

The piston 5 is connected to a crank shaft (not illustrated). When the engine 1 is activated, the piston 5 reciprocates in the cylinder 4 while sliding therealong in accordance with the crank angle. The piston 5 has a cavity 6, to be described below, in the top surface thereof.

The cylinder head 3 is provided on the cylinder block 2 and covers the cylinder 4, whereby a combustion chamber 7 is provided between the cylinder head 3 and the top surface of the piston 5. The cylinder head 3 has an intake port 3a and an exhaust port 3b. The intake port 3a and the exhaust port 3b are open to the combustion chamber 7. The cylinder head 3 further includes an intake valve and an exhaust valve (both not illustrated) that open and close the intake port 3a and the exhaust port 3b, respectively, a camshaft (not illustrated) that drives the intake valve and the exhaust valve, and so forth.

The cylinder head 3 includes a spark plug 8 and a fuel injection valve (hereinafter referred to as "injector") 9.

The spark plug 8 includes a plug body 8a and an electrode 8b provided at the tip of the plug body 8a. The spark plug 8 is attached to the cylinder head 3 at a nearly vertical angle. The electrode 8b includes a center electrode and a ground electrode that face each other. The electrode 8b faces toward a position near the center of the combustion chamber 7 from above and generates a spark for igniting an air-fuel mixture. The timing of generating a spark by the spark plug 8 (the timing of ignition) is controlled by a control device (not illustrated) in accordance with the operating state of the engine 1.

The injector 9 includes an injector body 9a and an electromagnetic valve provided in the injector body 9a. The electromagnetic valve includes a solenoid, a needle valve (both not illustrated), and so forth. The injector body 9a is provided at a position of the cylinder head 3 near the intake port 3a and obliquely at a nearly horizontal angle. The injector body 9a has, at the tip thereof, a plurality of injection ports H facing the combustion chamber 7.

High-voltage fuel is supplied to the injector 9 from a fuel pump (not illustrated). When the needle valve is opened, fuel mists are injected at respectively different predetermined angles from the plurality of injection ports H into the cylinder 4. The amount of fuel to be injected and the timing of injection from the injector 9 are controlled by the control device in accordance with the operating state of the engine 1.

Figure 4:
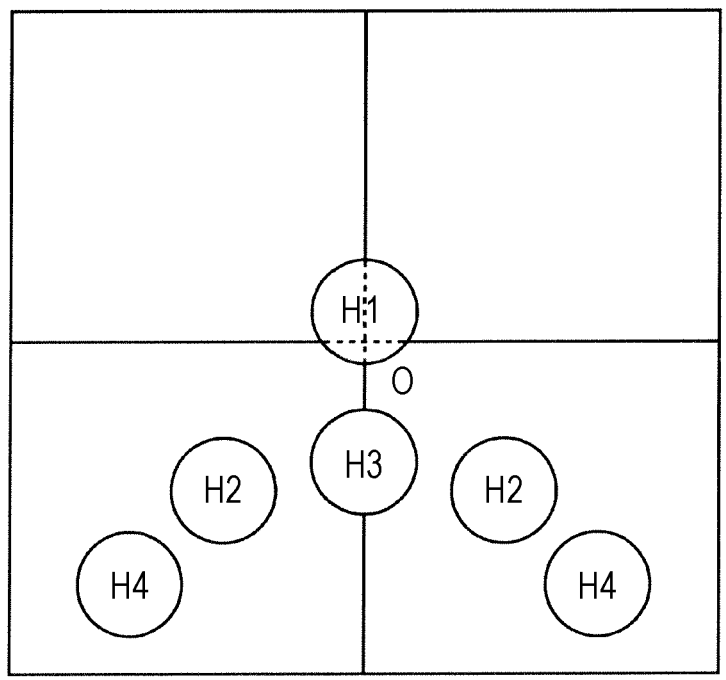
FIG. 4 illustrates an arrangement of and directions of injection from a plurality of injection ports provided in a fuel injection valve.

FIG. 4 illustrates an arrangement of the plurality of injection ports H provided in the injector 9 and directions (angles) of the different fuel mists injected from the respective injection ports H. In FIG. 4, an origin O corresponds to an axis of the injector body 9a (hereinafter referred to as "injector axis CI"). The right and left sides of the origin O correspond to the right and left sides of the injector axis CI seen from the injector 9. The upper and lower sides of the origin O correspond to a far side in the direction of the injector axis CI (a side farther from the injector 9) and the near side in the direction of the injector axis CI (a side nearer to the injector 9). As the distance from the origin O increases, the angle with respect to the injector axis CI increases.

As illustrated in FIG. 4, the plurality of injection ports H include a first injection port H1, a pair of right and left second injection ports H2, a third injection port H3, and a pair of right and left fourth injection ports H4. The first to fourth injection ports H1 to H4 are arranged bilaterally symmetrically with respect to the injector axis CI, and first to fourth fuel mists FM1 to FM4 are injected from the first to fourth injection ports H1 to H4, respectively, bilaterally symmetrically with respect to the injector axis CI.

Figure 5:
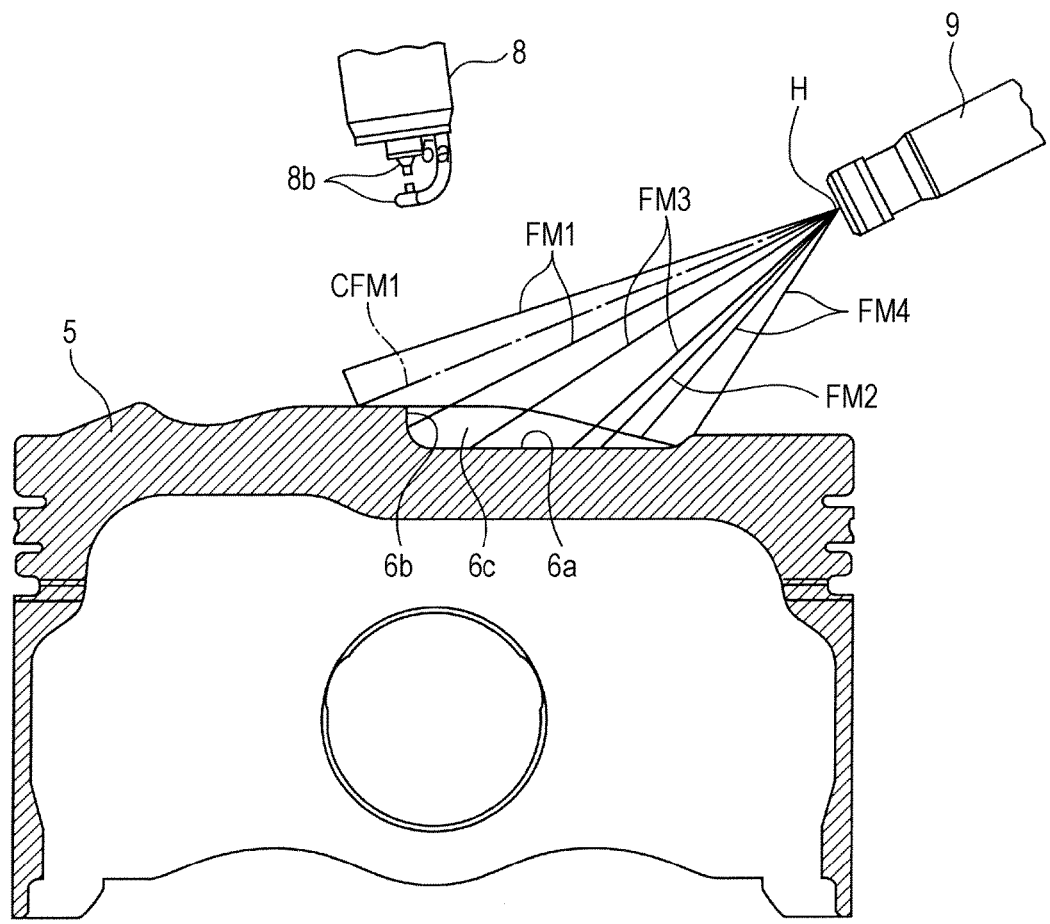
FIG. 5 is a partial enlarged sectional view of the piston illustrating a state of fuel injection in stratified combustion.
Figure 6:
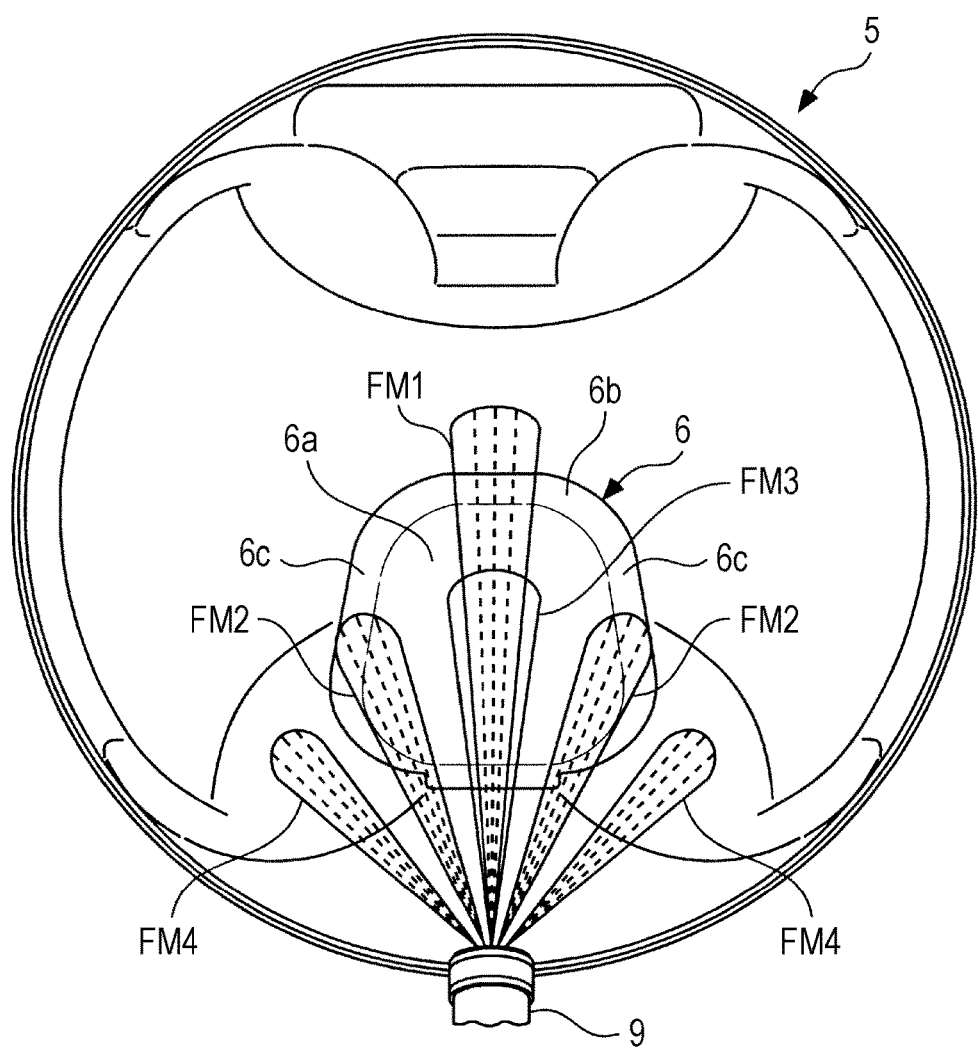
FIG. 6 is a plan view of the piston illustrating the state of fuel injection illustrated in FIG. 5.
Figure 7:
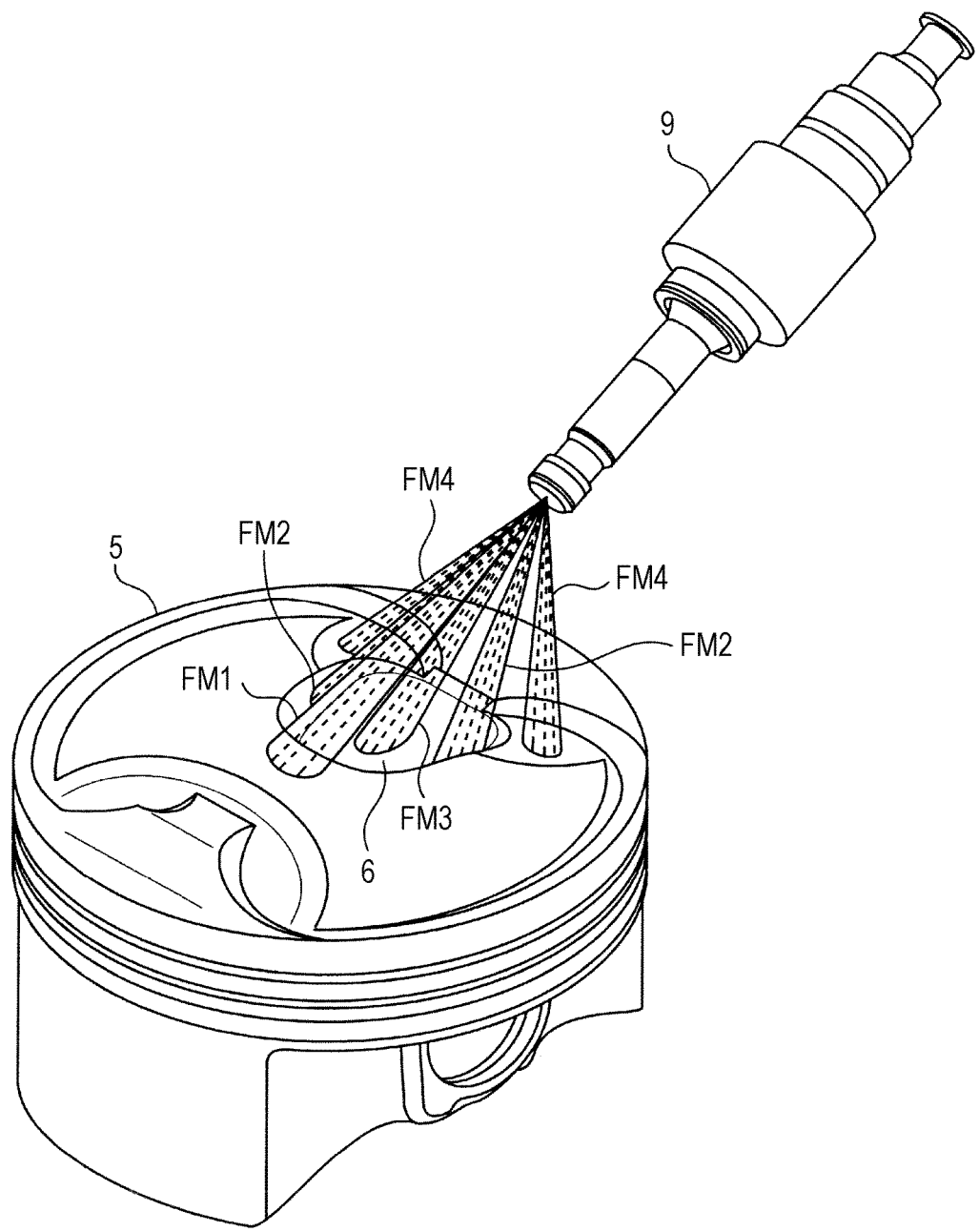
FIG. 7 is a perspective view of the piston illustrating the state of fuel injection illustrated in FIG. 5.

More specifically, referring to FIGS. 5 to 7, the first fuel mist FM1 is injected from the first injection port H1 toward a little far side in the direction of the injector axis CI. The second fuel mists FM2 are injected from the right and left second injection ports H2 bilaterally symmetrically with respect to the injector axis CI and toward the near side in the direction of the injector axis CI.

The third fuel mist FM3 is injected from the third injection port H3 toward the near side in the direction of the injector axis CI and on a little far side with respect to the second fuel mists FM2. The fourth fuel mists FM4 are injected from the right and left fourth injection ports H4 bilaterally symmetrically with respect to the injector axis CI and toward the outer sides and on the near side with respect to the second fuel mists FM2. The amounts of the six fuel mists injected from the first to fourth injection ports H1 to H4 are all set so as to be equal.

Figure 2:
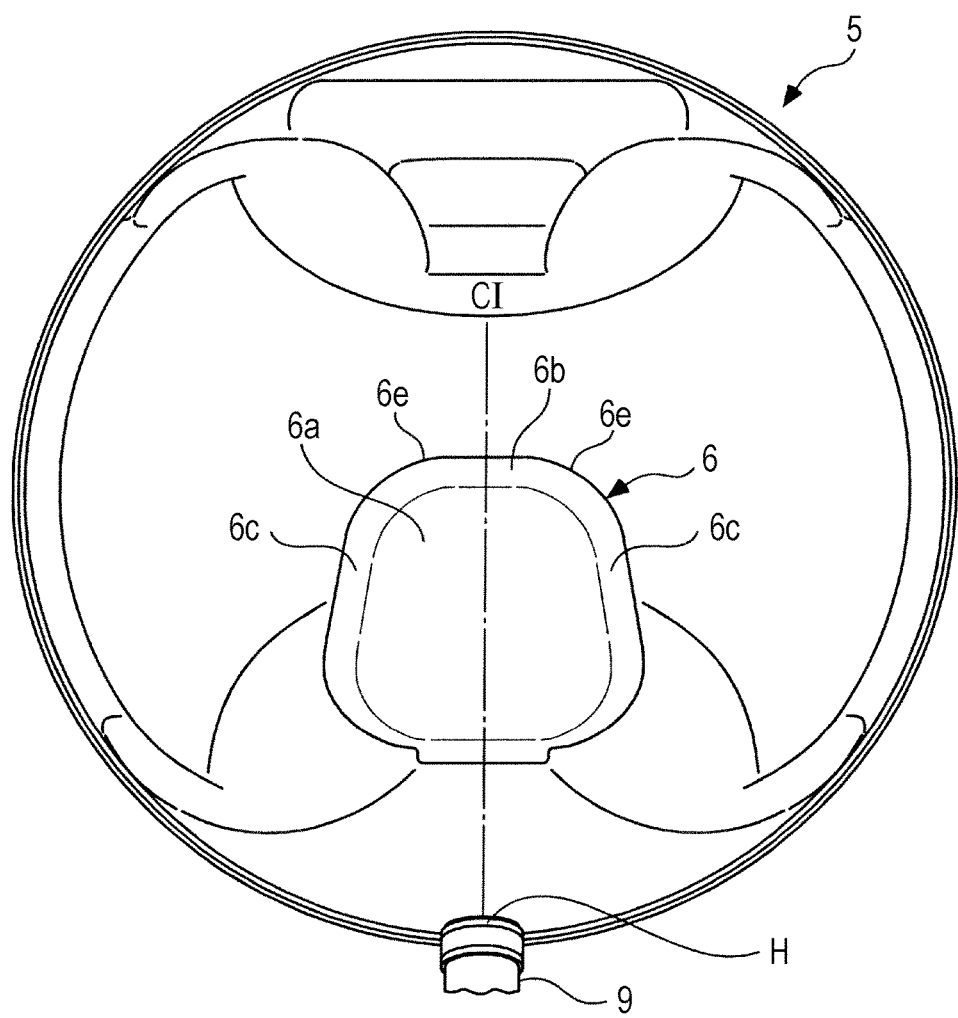
FIG. 2 is a plan view of a piston.
Figure 3:
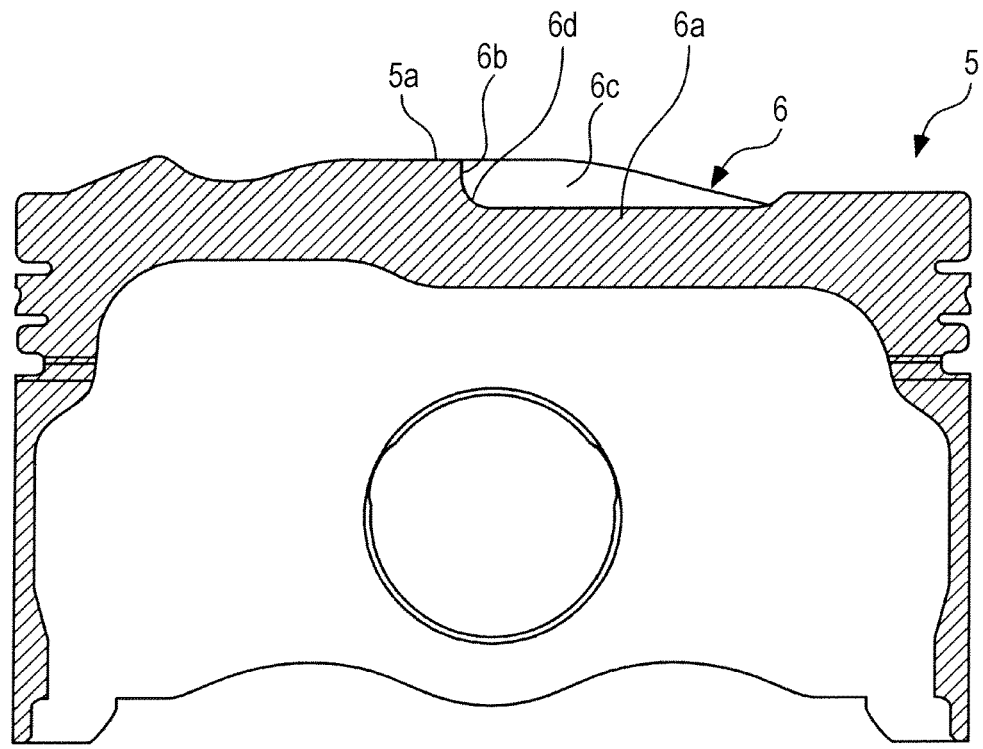
FIG. 3 is a partial enlarged sectional view of the piston.

Referring now to FIGS. 2 and 3, the top surface of the piston 5 will be described. As described above, the piston 5 has the cavity 6 in the top surface thereof. As illustrated in FIG. 2, the cavity 6 is provided in a portion of the top surface of the piston 5 defined by a length of about ⅓ of the diameter of the piston 5 in a direction from a position near the center of the piston 5 toward the injector 9 and a length of about ⅓ of the diameter of the piston 5 in the lateral direction. The cavity 6 has a bilateral symmetry with respect to the injector axis CI.

The cavity 6 has a flat bottom surface 6a, and a vertical wall 6b and a pair of right and left sidewalls 6c standing from the circumference of the bottom surface 6a. The vertical wall 6b is provided near the center of the piston 5 and extends from the bottom surface 6a with a curved transition portion 6d interposed therebetween. The vertical wall 6b substantially perpendicularly intersects an adjoining portion 5a of the top surface of the piston 5 that adjoins the cavity 6. The vertical wall 6b extends toward the right and left sides with respect to the center of the piston 5. The right and left sidewalls 6c extend from two ends of the vertical wall 6b with curved transition wall portions 6e interposed therebetween, respectively, and toward the injector 9. The distance between the right and left sidewalls 6c is reduced toward the vertical wall 6b.

Operations performed by the engine 1 configured as above will now be described. The engine 1 has two combustion modes provided for homogeneous combustion and stratified combustion that are performed selectively in accordance with the operating state of the engine 1. For example, homogeneous combustion is performed after the engine 1 has been warmed up, whereas stratified combustion is performed when the engine 1 starts to be cooled.

In homogeneous combustion, a homogeneous air-fuel mixture having a uniform air-fuel ratio is distributed over the entirety of the combustion chamber 7, and the homogeneous air-fuel mixture is ignited with a spark from the spark plug 8 and is burned. Although not illustrated, to cause homogeneous combustion, fuel is injected from the injector 9 at a predetermined crank angle in the intake stroke. With the downward movement of the piston 5, air is taken into the cylinder 4 via the intake port 3a and the intake valve that is open, whereby a tumble airflow occurs in the cylinder 4. In this state, the fuel is injected.

Consequently, the first to fourth fuel mists FM1 to FM4 that have been injected are diffused together with the tumble airflow, whereby a homogeneous air-fuel mixture is produced over the entirety of the inside of the cylinder 4. In this case, the amounts of the six fuel mists FM1 to FM4 injected from the injector 9 are all equal. Therefore, such a homogeneous air-fuel mixture is produced in a good manner. Subsequently, ignition is initiated with the spark plug 8 when the piston 5 is near the top dead center in the compression stroke, whereby the homogeneous air-fuel mixture is ignited and is burned. Thus, homogeneous combustion is made to occur.

In stratified combustion, a stratified air-fuel mixture is produced in which an air-fuel mixture having a rich air-fuel ratio is distributed around the electrode 8b of the spark plug 8 in the combustion chamber 7 while a lean air-fuel mixture is distributed in the other area of the combustion chamber 7. Then, the rich air-fuel mixture is ignited with a spark from the spark plug 8. The spark serves as an incendiary and causes flame propagation. Thus, combustion is made to occur.

To cause stratified combustion, fuel is injected from the injector 9 at a predetermined crank angle in the compression stroke, for example, at 45 degrees before the top dead center (BTDC) in the compression stroke. FIGS. 5 to 7 illustrate the positions to which the first to fourth fuel mists FM1 to FM4 are injected with respect to the cavity 6 and other members provided at the top of the piston 5.

As illustrated in FIGS. 5 to 7, the first fuel mist FM1 is injected toward the vertical wall 6b of the cavity 6 and toward the adjoining portion 5a of the top surface of the piston 5. In this case, as illustrated in FIG. 5, the first fuel mist FM1 is injected such that a center axis CFM1 thereof is directed toward the adjoining portion 5a of the piston 5.

Figure 8:
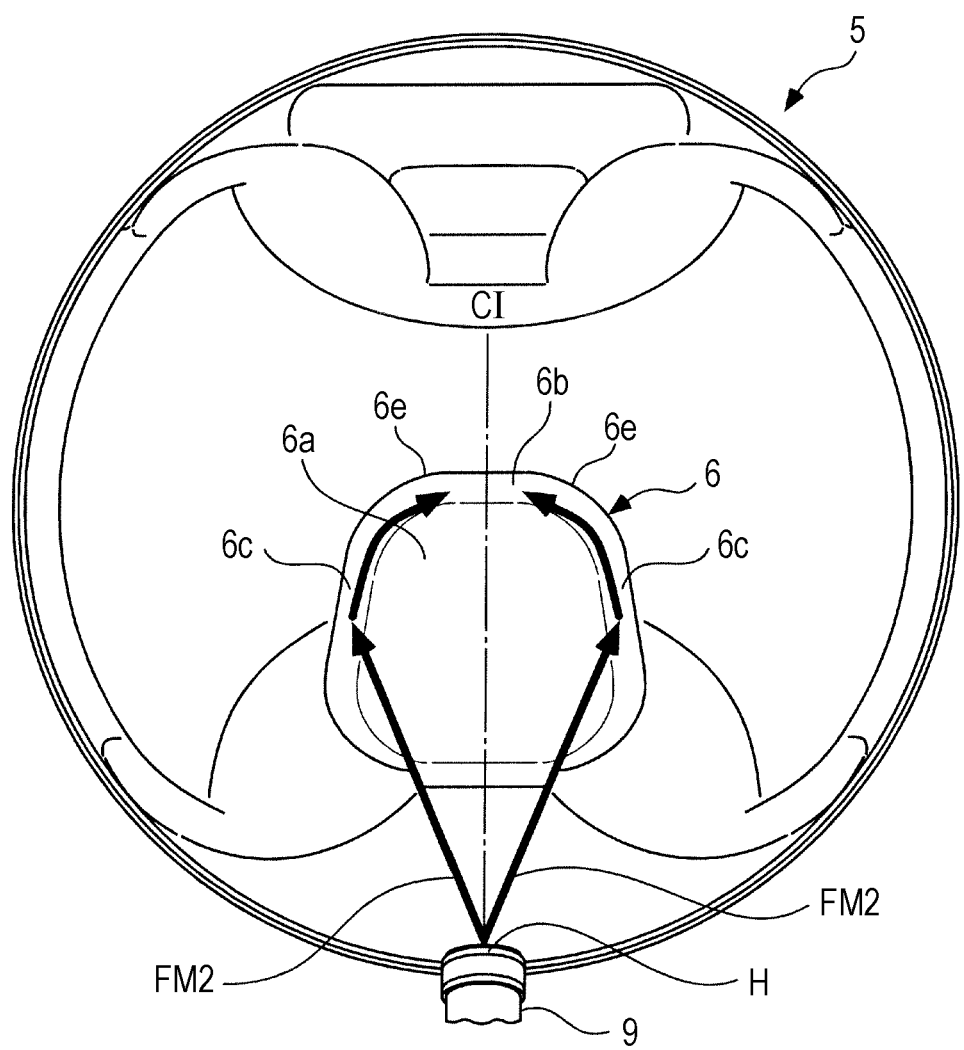
FIG. 8 illustrates how second fuel mists behave after colliding with the piston.

Referring to FIG. 8, the right and left second fuel mists FM2 collide with the right and left sidewalls 6c, respectively, of the cavity 6 and subsequently flow along the sidewalls 6c toward the vertical wall 6b.

Figure 9:
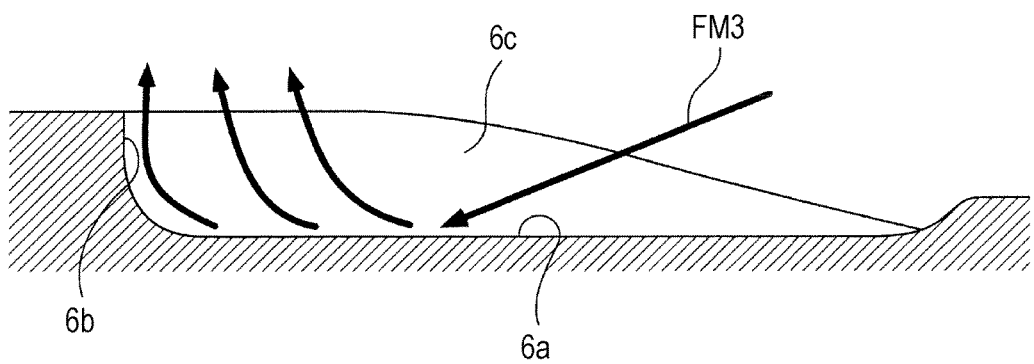
FIG. 9 illustrates how a third fuel mist behaves after colliding with the piston.

Referring to FIG. 9, the third fuel mist FM3 collides with and is reflected by the bottom surface 6a of the cavity 6, whereby the third fuel mist FM3 swirls and flows upward. Meanwhile, the first fuel mist FM1 and the second fuel mists FM2 gathered near the vertical wall 6b are lifted by the swirl of the third fuel mist FM3, are guided along the vertical wall 6b, and are directed together with the third fuel mist FM3 toward the spark plug 8 residing substantially right above the vertical wall 6b. Furthermore, since the third fuel mist FM3 collides with the bottom surface 6a of the cavity 6, the kinetic energy of the third fuel mist FM3 is reduced to some extent. Hence, the amount of fuel mist flowing into the exhaust port 3b is reduced.

The right and left fourth fuel mists FM4 collide with flat portions, respectively, of the top surface of the piston 5 that are on the near side and on the outer sides with respect to the cavity 6, where the fourth fuel mists FM4 are reflected and are diffused toward the outer sides and toward the upper side. The fourth fuel mists FM4 adjust the air-fuel ratio of the entirety of the air-fuel mixture. The fourth fuel mists FM4 do not directly affect the production of the rich air-fuel mixture around the spark plug 8 from the first to third fuel mists FM1 to FM3 described above.

Thus, fuel mists are effectively gathered around the electrode 8b of the spark plug 8. Therefore, a rich air-fuel mixture is assuredly produced while a leaner air-fuel mixture is produced in the other area of the combustion chamber 7. Furthermore, the rich air-fuel mixture is ignited with a spark from the spark plug 8 at a predetermined crank angle near the top dead center in the compression stroke, for example, at 0 to 5 degrees after the top dead center (ATDC) in the compression stroke. This ignition of the air-fuel mixture as an incendiary spark causes flame propagation. Thus, stratified combustion is made to occur.

As described above, according to the present embodiment, the bottom surface 6a, the vertical wall 6b, and the right and left sidewalls 6c of the cavity 6 provided in the piston 5 and the first to third fuel mists FM1 to FM3 that are injected toward them from the injector 9 function in combination such that the fuel mists FM1 to FM3 are effectively gathered around the spark plug 8, assuredly producing a rich air-fuel mixture while accurately producing a stratified air-fuel mixture having a desired air-fuel-ratio distribution. Therefore, unlike the related-art case where fuel mists injected from the fuel injection valve are individually guided by the respective guiding walls, a good incendiary spark is produced around the spark plug 8. This good incendiary spark causes flame propagation. Thus, stable stratified combustion is assuredly made to occur.

Furthermore, the center axis CFM1 of the first fuel mist FM1 is directed toward the adjoining portion 5a of the piston 5, and the first fuel mist FM1 is therefore directed toward the spark plug 8 by the third fuel mist FM3 that has been reflected by the bottom surface 6a of the cavity 6. Hence, a rich air-fuel mixture is produced around the spark plug 8 in a better manner.

Furthermore, the sidewalls 6c of the cavity 6 extend such that the distance therebetween is reduced toward the vertical wall 6b. Therefore, the second fuel mists FM2 that have collided with the sidewalls 6c are directed along the sidewalls 6c toward the center of the piston 5, where the second fuel mists FM2 are gathered. Thus, a rich air-fuel mixture is produced around the spark plug 8 in a much better manner.

Furthermore, in addition to the first to third fuel mists FM1 to FM3, the right and left fourth fuel mists FM4 are injected in such a manner as to collide with the flat portions of the top surface of the piston 5 that are on the near side and on the outer sides with respect to the cavity 6. Therefore, the air-fuel ratio of the entirety of the air-fuel mixture is easily adjustable without directly affecting the production of the rich air-fuel mixture around the spark plug 8 from the first to third fuel mists FM1 to FM3.

Furthermore, the amounts of the six fuel mists FM1 to FM4 that are injected from the first to fourth injection ports H1 to H4 of the injector 9 are all equal. Therefore, a homogeneous air-fuel mixture for causing homogeneous combustion is produced in a good manner.

Figure 10A:
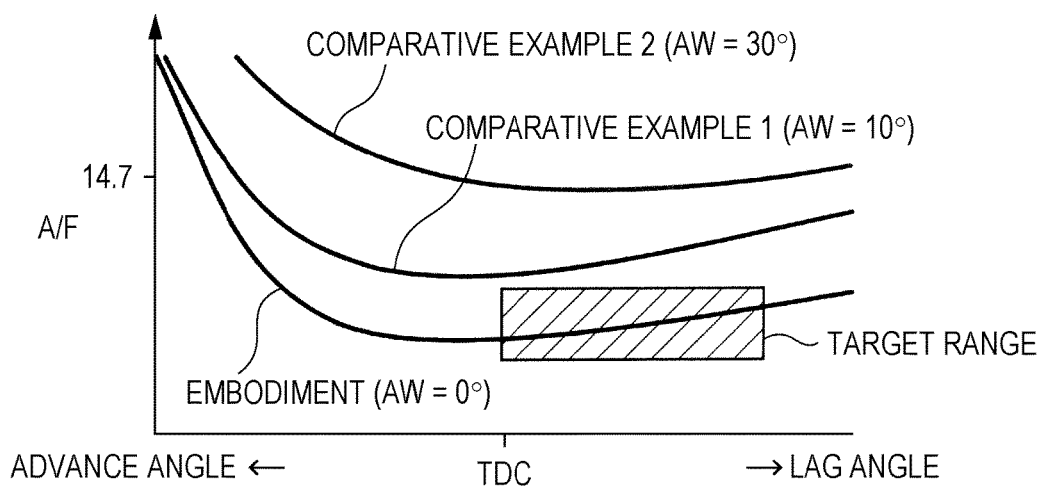
FIGS. 10A and 10B are graphs illustrating exemplary operations realized in the embodiment and in comparative examples.
Figure 10B:
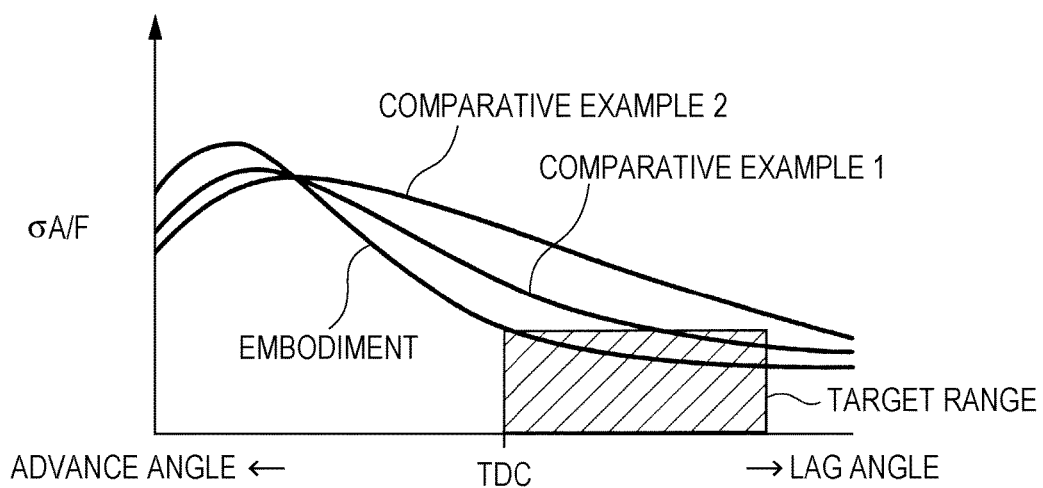
Figure 11:
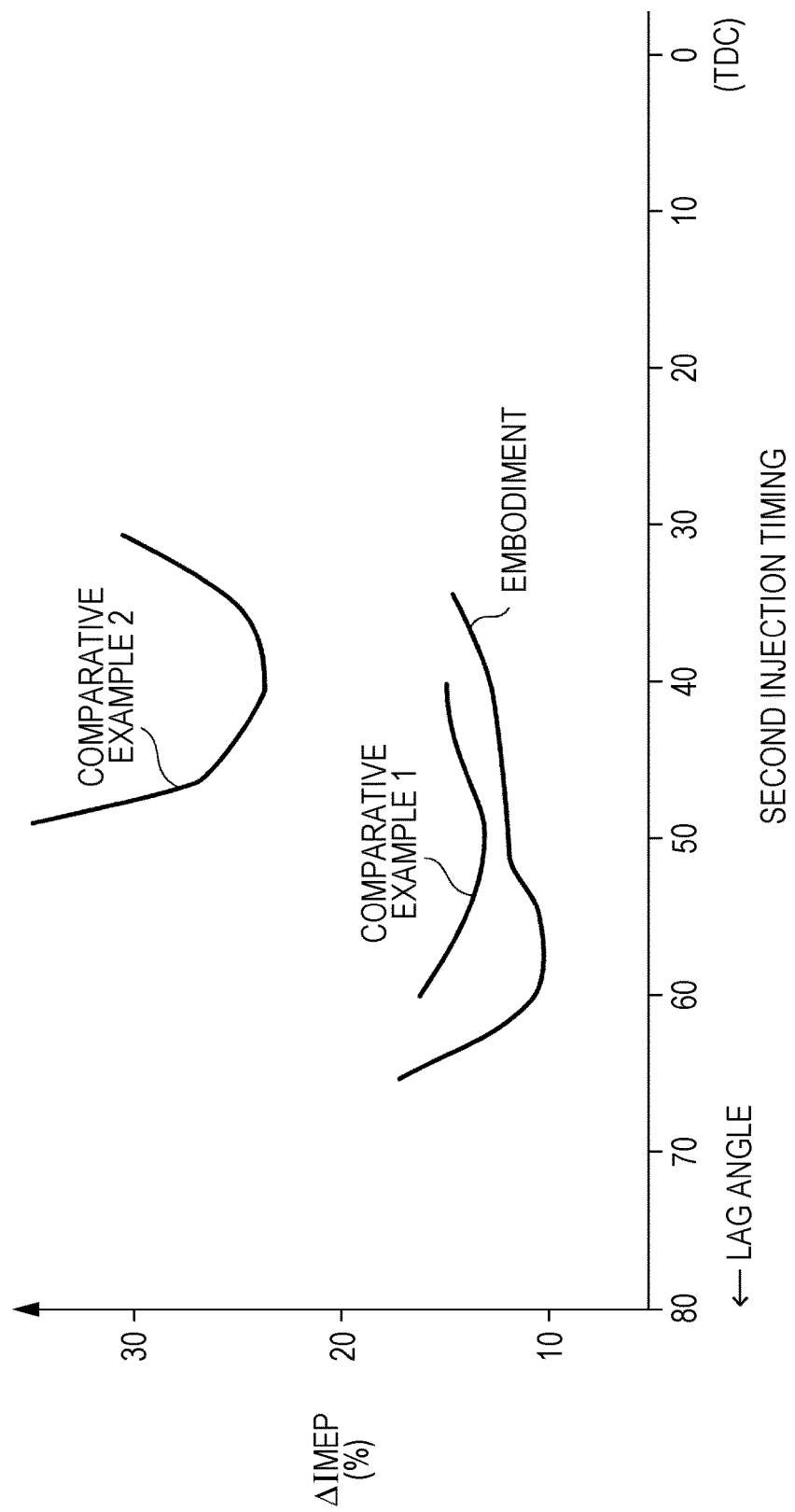
FIG. 11 is a graph illustrating other exemplary operations realized in the embodiment and in the comparative examples.

FIGS. 10A, 10B, and 11 are graphs illustrating the results of tests, for an example according to the present embodiment and for two comparative examples, performed as a demonstration of effects produced by the engine 1 according to the present embodiment. In the present embodiment, the vertical wall 6b of the cavity 6 has an angle of slope AW of 0 degrees with respect to the vertical. In each of Comparative Examples 1 and 2, a wall portion was provided instead of the vertical wall 6b. The wall portions according to Comparative Examples 1 and 2 formed sloping walls sloping toward the exhaust port 3b at angles of slope AW of 10 degrees and 30 degrees, respectively, with respect to the vertical.

FIGS. 10A and 10B are graphs illustrating measurements of the air-fuel ratio of the air-fuel mixture around the spark plug 8 obtained through fuel injection in the compression stroke. In this test, fuel was injected at 45 degrees before the top dead center (BTDC) in the compression stroke, and the air-fuel ratio of the air-fuel mixture around ($\phi$=10 mm) the electrode 8b of the spark plug 8 and the crank angle were measured. The test was performed a predetermined number of times (for example, 100 times). Then, the average and the standard deviation of the air-fuel ratios for the predetermined number of measurements were calculated as around-the-plug air-fuel ratio A/F and air-fuel-ratio standard deviation $\sigma$A/F. FIGS. 10A and 10B illustrate the around-the-plug air-fuel ratio A/F and the air-fuel-ratio standard deviation $\sigma$A/F, respectively, versus the crank angle.

As illustrated in FIG. 10A, in each of Comparative Examples 1 and 2, the around-the-plug air-fuel ratio A/F was generally high and varied on the lean side. Particularly, in Comparative Example 2 in which the angle of slope AW of the wall portion was 30 degrees, an air-fuel mixture having a higher air-fuel ratio than the theoretical air-fuel ratio (=14.7) was not obtained. The reason for this is considered as follows. In each of Comparative Examples 1 and 2, the wall portion corresponding to the vertical wall 6b of the cavity 6 sloped toward the exhaust port 3b. Therefore, fuel mists including the first fuel mist FM1 tended to flow toward the exhaust port 3b. In addition, the directivity of fuel mists toward the spark plug 8 determined by the wall portion was low.

According to the above results, in each of Comparative Examples 1 and 2, the around-the-plug air-fuel ratio A/F immediately after the top dead center (TDC) in the compression stroke corresponding to the timing of ignition by the spark plug 8 did not reach a predetermined target range (the hatched area in FIG. 10A), failing in producing a desired rich air-fuel mixture around the spark plug 8.

In contrast, in the example according to the embodiment, the around-the-plug air-fuel ratio A/F was generally low and varied on the rich side. Furthermore, the around-the-plug air-fuel ratio A/F fell within the target range immediately after the top dead center in the compression stroke corresponding to the timing of ignition. Thus, a rich mixture having a desired air-fuel ratio was produced around the spark plug 8 in a good manner.

Referring now to FIG. 10B, in each of Comparative Examples 1 and 2, the air-fuel-ratio standard deviation $\sigma$A/F was generally high and hardly fell within a predetermined target range (the hatched area in FIG. 10B) even immediately after the top dead center in the compression stroke. That is, the variation in the around-the-plug air-fuel ratio A/F was large.

In contrast, in the example according to the embodiment, the air-fuel-ratio standard deviation $\sigma$A/F was generally low and fell within the predetermined target range immediately after the top dead center in the compression stroke. That is, the variation in the around-the-plug air-fuel ratio A/F was small. Thus, it has been demonstrated that, according to the present embodiment, a rich mixture having a desired air-fuel ratio that is suitable for stratified combustion is accurately produced around the spark plug 8.

FIG. 11 is a graph illustrating the results of a test performed for evaluating the stability of stratified combustion. In this test, while the engine 1 was under predetermined operating conditions, a first fuel injection was performed at 70 degrees ATDC in the intake stroke and a second fuel injection was performed in the compression stroke so as to cause stratified combustion. In this test, an illustrated mean effective pressure IMEP was calculated. Furthermore, the timing of the second fuel injection (hereinafter referred to as "second injection timing") was varied among different predetermined crank angles. Then, the test was performed a predetermined number of times (for example, 100 times) at every second injection timing. In addition, at every second injection timing, the ratio of the standard deviation to the average of the illustrated mean effective pressures IMEP for the predetermined number of times (=standard deviation/average) was calculated as a combustion stability parameter $\Delta$IMEP representing the stability of combustion. FIG. 11 illustrates the combustion stability parameter $\Delta$IMEP versus the second injection timing.

As illustrated in FIG. 11, although the combustion stability parameter $\Delta$IMEP was low in Comparative Example 1, the combustion stability parameter $\Delta$IMEP was as high as about 25% or above in Comparative Example 2, indicating that the combustion stability was very low. Particularly, in Comparative Example 2, the combustion stability parameter $\Delta$IMEP varied significantly with the second injection timing. This demonstrates that, if the timing of injection in the compression stroke is changed, the stability of combustion is further reduced.

In contrast, in the example according to the embodiment, the combustion stability parameter $\Delta$IMEP was lower than that of Comparative Example 1 and fell within a range of 10 to 15%. That is, the stability of combustion was very high regardless of the timing of injection in the compression stroke.

The present application is not limited to the above-described embodiment and may be embodied in various ways. For example, while the above embodiment concerns a case where the fourth fuel mists FM4 are injected for adjusting the air-fuel ratio of the entirety of the air-fuel mixture, the fourth fuel mists FM4 may be omitted if the air-fuel ratio does not need to be adjusted.

The above embodiment concerns an exemplary case where the present application is applied to an in-line gasoline engine provided in a vehicle. The present application is not limited to such an embodiment and is also applicable to any other engines including V-engines and horizontally opposed engines, and to engines for machines other than vehicles. For example, the present application is also applicable to vessel propulsion engines such as an outboard motor having a vertically extending crank shaft. In addition, other details of the above embodiment may be modified, according to need, within the scope of the present application.

According to a first aspect of the embodiment, there is provided an in-cylinder direct-injection internal-combustion engine (1) in which fuel is directly injected into a cylinder (4) and a mixture of the fuel and air taken into the cylinder (4) is ignited with a spark and is burned. The internal-combustion engine (1) includes a piston (5) having a cavity (6) in a top surface thereof and configured to reciprocate in the cylinder (4); a spark plug (8) facing, from above, toward a position near the center of a combustion chamber (7) provided in the cylinder (4), the spark plug (8) being configured to generate a spark that ignites the mixture; and a fuel injection valve (9) facing the combustion chamber (7) and having a plurality of injection ports (first to fourth injection ports H1 to H4) from which a plurality of fuel mists are obliquely injected, respectively, toward the top surface of the piston (5), the plurality of fuel mists being injected at a predetermined crank angle in a compression stroke and in respectively different directions. The cavity (6) extends from a position near the center of the piston (5) toward the fuel injection valve (9) and has a bottom surface (6a), a vertical wall (6b) provided near the center of the piston (5) and standing substantially perpendicularly from the bottom surface (6a), and a pair of sidewalls (6c) continuous with two ends, respectively, of the vertical wall (6b) and extending toward the fuel injection valve (9). The plurality of fuel mists includes a first fuel mist (FM1) that is injected toward the vertical wall (6b) of the cavity (6) and an adjoining portion (5a) included in the top surface of the piston (5a) that adjoins the vertical wall (6b), a pair of second fuel mists (FM2) that collide with the pair of sidewalls (6c), respectively, of the cavity (6) and flow along the pair of sidewalls (6c) toward the vertical wall (6b), and a third fuel mist (FM3) that collides with the bottom surface (6a) of the cavity (6) and lifts and directs the first fuel mist (FM1) and the second fuel mists (FM2) toward the spark plug (8).

In the above internal-combustion engine of the embodiment, the first fuel mist is injected toward the vertical wall of the cavity and the adjoining portion included in the top surface of the piston that adjoins the vertical wall. The pair of second fuel mists collide with the pair of sidewalls, respectively, of the cavity and flow along the pair of sidewalls toward the vertical wall.

The third fuel mist collides with the bottom surface of the cavity, where the third fuel mist is reflected, whereby the third fuel mist swirls and flows upward. Meanwhile, the first fuel mist and the second fuel mists gathered near the vertical wall are lifted by the swirl of the third fuel mist, are guided along the vertical wall, and are directed together with the third fuel mist toward the spark plug residing above the vertical wall. Furthermore, since the third fuel mist collides with the bottom surface of the cavity, the kinetic energy of the third fuel mist is reduced to some extent. Hence, the amount of fuel mist flowing toward a side opposite to the fuel injection valve is reduced.

As a result, the first to third fuel mists are effectively gathered around the spark plug. Therefore, a rich air-fuel mixture is assuredly produced while a leaner air-fuel mixture is produced in the other area of the combustion chamber. Furthermore, the rich air-fuel mixture produced around the spark plug is ignited with a spark from the spark plug. This ignition of the air-fuel mixture as an incendiary spark causes flame propagation. Thus, stratified combustion is made to occur.

As described above, according to the above aspect of the embodiment, the bottom surface, the vertical wall, and the pair of sidewalls of the cavity provided in the piston and the first to third fuel mists that are injected toward them from the fuel injection valve function in combination such that the fuel mists are effectively gathered around the spark plug, assuredly producing a rich air-fuel mixture while accurately producing a stratified air-fuel mixture having a desired air-fuel-ratio distribution. Therefore, unlike the related-art case where fuel mists injected from the fuel injection valve are individually guided by the respective guiding walls, a good incendiary spark is produced around the spark plug. This good incendiary spark causes flame propagation. Thus, stable stratified combustion is assuredly made to occur.

In the internal-combustion engine (1) according to the first aspect of the embodiment, the first fuel mist (FM1) is preferably injected with a center axis (CFM1) thereof being directed toward the adjoining portion (5a) included in the top surface of the piston (5) and is preferably directed toward the spark plug (8) by the third fuel mist (FM3) having been reflected by the bottom surface (6a) of the cavity (6).

In such a configuration, the first fuel mist is directed toward the spark plug by the third fuel mist without colliding with the top surface of the piston. Therefore, a rich air-fuel mixture is produced around the spark plug in a better manner.

In the above internal-combustion engine (1) of the embodiment, the plurality of fuel mists preferably further include a pair of fourth fuel mists (FM4) that are injected toward outer sides of the pair of second fuel mists (FM2), respectively, and toward a side nearer to the fuel injection valve (9) than the second fuel mists (FM2), the fourth fuel mists (FM4) colliding with portions, respectively, of the top surface of the piston (5) excluding the cavity (6).

In such a configuration of the embodiment, the air-fuel ratio of the entirety of the air-fuel mixture is easily adjustable by the pair of fourth fuel mists that are injected in addition to the first to third fuel mists. Furthermore, the fourth fuel mists are injected in the above-described directions and toward the above-described portions that are different from those of the first to third fuel mists and collide with the portions. Therefore, the fourth fuel mists do not directly affect the production of the rich air-fuel mixture around the spark plug from the first to third fuel mists.

In the above internal-combustion engine (1) of the embodiment, the first fuel mist (FM1), each of the pair of second fuel mists (FM2), the third fuel mist (FM3), and each of the pair of fourth fuel mists (FM4) are preferably of the same amount.

For example, in a case where homogeneous combustion is made to occur, instead of stratified combustion, by injecting the fuel in the intake stroke in accordance with the operating state of the internal-combustion engine, a homogeneous air-fuel mixture needs to be distributed over the entirety of the inside of the cylinder so as to assuredly cause good homogeneous combustion. In the above configuration, since the first to fourth fuel mists are of the same amount, such a homogeneous air-fuel mixture is produced in a good manner.

In the above internal-combustion engine (1) of the embodiment, a distance between the pair of sidewalls (6c) of the cavity (6) is preferably reduced toward the vertical wall (6b).

In such a configuration of the embodiment, the second fuel mists having collided with the pair of sidewalls flow along the sidewalls and are directed and gathered toward the center of the piston. Therefore, a rich air-fuel mixture is produced around the spark plug in a better manner.

Obviously, numerous modifications and variations of the present invention are possible in light of the above teachings. It is therefore to be understood that within the scope of the appended claims, the invention may be practiced otherwise than as specifically described herein.

What is claimed is:

1. An internal-combustion engine comprising:
a cylinder including a combustion chamber;
a piston provided in the cylinder to reciprocate in the cylinder and including a top surface and a cavity provided in the top surface and having a front half and a rear half, the cavity comprising:
  a bottom surface;
  a vertical wall at the front half of the cavity provided near a center of the top surface and standing substantially perpendicularly from the bottom surface, the vertical wall extending from the bottom surface to the top surface;
  a first sidewall extending toward a first end of the vertical wall and extending from the bottom surface to the top surface;
  a second sidewall extending toward a second end of the vertical wall, the second end being opposite to the first end in the vertical wall, the second sidewall extending from the bottom surface to the top surface;
  a first curved transition wall portion between the first sidewall and the vertical wall; and
  a second curved transition wall portion between the second sidewall and the vertical wall;
a spark plug provided above the combustion chamber to generate a spark that ignites a mixture of fuel and air in the cylinder and to face toward a position close to a center of the combustion chamber; and
a fuel injection valve facing the combustion chamber and including a plurality of injection ports from which a plurality of fuel mists are to be obliquely injected toward the top surface of the piston in respectively different directions at a predetermined crank angle in a compression stroke, the cavity extending from a position close to a center of the piston toward the fuel injection valve when viewed from above the top surface of the piston, the first and second sidewalls extending toward the fuel injection valve when viewed from above the top surface of the piston, the plurality of injection ports comprising:
  a first injection port from which a first fuel mist is to be injected at the predetermined crank angle toward the vertical wall and an adjoining portion adjoining the vertical wall, the adjoining portion being provided in the top surface of the piston, the top surface of the piston including an uppermost surface of the piston;
  second injection ports from which a pair of second fuel mists are to be injected at the predetermined crank angle to respectively collide with the first and second sidewalls, the first and second sidewalls being provided to guide the second fuel mists to flow along the first and second sidewalls toward the vertical wall, the first and second curved transition wall portions being provided to guide the second fuel mists to flow from the first and second side walls toward the vertical wall; and
  a third injection port from which a third fuel mist is to be injected to collide with the bottom surface of the cavity, the bottom surface including a lowest surface of the cavity, the bottom surface being provided to lift the first fuel mist and the second fuel mists to flow toward the spark plug together with the third fuel mist after the third fuel mist collides with the lowest surface of the cavity,
wherein a distance between the first and second sidewalls continuously reduces beginning within the rear half of the cavity and continuing to the first curved transition wall portion along a direction toward the vertical wall.

2. The internal-combustion engine according to claim 1, wherein the first injection port includes a center axis along which the first fuel mist is to be injected from the first injection port, the center axis of the first injection port being provided to direct at the predetermined crank angle toward the adjoining portion provided in the top surface of the piston, the bottom surface of the cavity being provided to reflect the third fuel mist so that the first fuel mist is directed toward the spark plug by the third fuel mist having been reflected by the bottom surface of the cavity.

3. The internal-combustion engine according to claim 1, wherein the plurality of injection ports further comprises
a pair of fourth injection ports from which a pair of fourth fuel mists are to be injected at the predetermined crank angle toward respective outer sides of the pair of second fuel mists, and toward a side closer to the fuel injection valve than the second fuel mists, and
wherein the fourth fuel mists are injected at the predetermined crank angle from the fourth injection ports to respectively collide with portions other than the cavity in the top surface of the piston.

4. The internal-combustion engine according to claim 3, wherein the first fuel mist, each of the pair of second fuel mists, the third fuel mist, and each of the pair of fourth fuel mists are of a same amount as each other.

5. The internal-combustion engine according to claim 1, wherein the third fuel mist is injected at the predetermined crank angle from the third injection port toward a space between the second fuel mists.

6. The internal-combustion engine according to claim 1, wherein the first injection port includes a center axis and the first fuel mist is injected from the first injection port to align with the center axis of the piston.

7. An internal-combustion engine comprising:
a cylinder including a combustion chamber;
a piston provided in the cylinder to reciprocate in the cylinder and including a top surface and a cavity provided in the top surface and having a front half and a rear half, the cavity comprising:
  a bottom surface;
  a vertical wall at the front half of the cavity provided near a center of the top surface and standing substantially perpendicularly from the bottom surface, the vertical wall extending from the bottom surface to the top surface;
  a first sidewall extending toward a first end of the vertical wall and extending from the bottom surface to the top surface;
  a second sidewall extending toward a second end of the vertical wall, the second end being opposite to the first end in the vertical wall, the second sidewall extending from the bottom surface to the top surface;
  a first curved transition wall portion between the first sidewall and the vertical wall; and
  a second curved transition wall portion between the second sidewall and the vertical wall;
a spark plug provided above the combustion chamber to generate a spark that ignites a mixture of fuel and air in the cylinder and to face toward a position close to a center of the combustion chamber; and
a fuel injection valve facing the combustion chamber and including a plurality of injection ports from which a plurality of fuel mists are to be obliquely injected toward the top surface of the piston in respectively different directions at a predetermined crank angle in a compression stroke, the cavity extending from a position close to a center of the piston toward the fuel injection valve when viewed from above the top surface of the piston, the first and second sidewalls extending toward the fuel injection valve when viewed from above the top surface of the piston, the plurality of injection ports comprising:
  a first injection port from which a first fuel mist is to be injected at the predetermined crank angle toward the vertical wall and an adjoining portion adjoining the vertical wall, the adjoining portion being provided in the top surface of the piston;
  second injection ports from which a pair of second fuel mists are to be injected at the predetermined crank angle to respectively collide with the first and second sidewalls, the first and second sidewalls being provided to guide the second fuel mists to flow along the first and second sidewalls toward the vertical wall, the first and second curved transition wall portions being provided to guide the second fuel mists to flow from the first and second side walls toward the vertical wall; and
  a third injection port from which a third fuel mist is to be injected to collide with the bottom surface of the cavity, the bottom surface being provided to lift the first fuel mist and the second fuel mists to flow toward the spark plug,
wherein the plurality of injection ports further comprises a pair of fourth injection ports from which a pair of fourth fuel mists are to be injected at the predetermined crank angle from the fourth injection ports such that an entirety of each of the pair of fourth fuel mists each respectively collide with portions other than the cavity in the top surface of the piston,
wherein the pair of fourth fuel mists are injected toward a position closer to the fuel injection valve than corresponding positions to which the pair of second fuel mists are injected as measured in a direction parallel to a center axis of the piston, and
wherein a distance between the first and second sidewalls continuously reduces beginning within the rear half of the cavity and continuing to the first curved transition wall portion along a direction toward the vertical wall.

8. The internal-combustion engine according to claim 1, wherein the bottom surface is a flat surface.

9. The internal-combustion engine according to claim 1, wherein the adjoining portion is disposed outside of the cavity.

10. The internal-combustion engine according to claim 1, wherein the first curved transition wall portion and the second curved transition wall portion are both concave.

11. The internal-combustion engine according to claim 1, wherein the vertical wall that extends from the bottom surface to the top surface forms an outer peripheral edge of the cavity disposed at the top surface of the piston.

12. The internal-combustion engine according to claim 1, wherein the first curved transition wall portion and the second curved transition wall portion are both concave, and
wherein the vertical wall that extends from the bottom surface to the top surface forms an outer peripheral edge of the cavity disposed at the top surface of the piston.

13. The internal-combustion engine according to claim 7, wherein the entirety of each of the pair of fourth fuel mists respectively collide with portions other than the cavity in the top surface of the piston in a stratified combustion mode.

14. The internal-combustion engine according to claim 1, wherein the first and second sidewalls include flat surfaces between which the distance between the first and second sidewalls is continuously reduced along the direction toward the vertical wall.

15. The internal-combustion engine according to claim 7, wherein the first and second sidewalls include flat surfaces between which the distance between the first and second sidewalls is continuously reduced.

16. The internal-combustion engine according to claim 1, wherein the distance between the first and second sidewalls along the direction toward the vertical wall reduces at a constant rate from within the rear half of the cavity to the first curved transition wall portion at the front half of the cavity.

17. The internal-combustion engine according to claim 1, wherein the end of the cavity opposite the vertical wall includes a rectangular portion that protrudes from the rear half of the cavity.

18. The internal-combustion engine according to claim 1, further comprising a third curved transition wall portion connected to a rear end of the cavity and opposite the first transition wall portion in a direction parallel to an extending direction of the first sidewall,
wherein the distance between the first and second sidewalls continuously reduces from the third curved transition wall portion to the first curved transition wall portion along the direction toward the vertical wall.

19. The internal-combustion engine according to claim 7, wherein the position to which the pair of fourth fuel mists are injected is disposed above the position to which the pair of second fuel mists are injected in a direction toward the spark plug.

20. The internal-combustion engine according to claim 1, wherein a width of the cavity, as measured in a direction orthogonal to a center axis of the piston, continuously reduces between a maximum width and a minimum width, the maximum width being located within the rear half of the cavity and the minimum width being located within the front half of the cavity.

21. The internal-combustion engine according to claim 1, wherein the first injection port includes a center axis along which the first fuel mist is to be injected from the first injection port, and
wherein the front half and the rear half of the cavity form opposite halves of the cavity as measured along the center axis.

22. The internal-combustion engine according to claim 7, wherein a width of the cavity, as measured in a direction orthogonal to a center axis of the piston, continuously reduces between a maximum width and a minimum width, the maximum width being located within the rear half of the cavity and the minimum width being located within the front half of the cavity.

23. The internal-combustion engine according to claim 7, wherein the first injection port includes a center axis along which the first fuel mist is to be injected from the first injection port, and
wherein the front half and the rear half of the cavity form opposite halves of the cavity as measured along the center axis.

24. An internal-combustion engine comprising:
a cylinder including a combustion chamber;
a piston provided in the cylinder to reciprocate in the cylinder and including a top surface and a cavity provided in the top surface and having a front half and a rear half, the cavity comprising:

a bottom surface;

a vertical wall at the front half of the cavity and provided near a center of the top surface and standing substantially perpendicularly from the bottom surface, the vertical wall extending from the bottom surface to the top surface;

a first sidewall extending toward a first end of the vertical wall and extending from the bottom surface to the top surface;

a second sidewall extending toward a second end of the vertical wall, the second end being opposite to the first end in the vertical wall, the second sidewall extending from the bottom surface to the top surface;

a first curved transition wall portion between the first sidewall and the vertical wall; and a second curved transition wall portion between the second sidewall and the vertical wall;

a spark plug provided above the combustion chamber to generate a spark that ignites a mixture of fuel and air in the cylinder and to face toward a position close to a center of the combustion chamber; and a fuel injection valve facing the combustion chamber and including a plurality of injection ports from which a plurality of fuel mists are to be obliquely injected toward the top surface of the piston in respectively different directions at a predetermined crank angle in a compression stroke, the cavity extending from a position close to a center of the piston toward the fuel injection valve when viewed from above the top surface of the piston, the first and second sidewalls extending toward the fuel injection valve when viewed from above the top surface of the piston, the plurality of injection ports comprising:

a first injection port from which a first fuel mist is to be injected at the predetermined crank angle;

second injection ports from which a pair of second fuel mists are to be injected at the predetermined crank angle; and a third injection port from which a third fuel mist is to be injected, wherein a distance between the first and second sidewalls continuously reduces beginning within the rear half of the cavity and continuing to the first curved transition wall portion along a direction toward the vertical wall.

* * * * *